United States Patent

[11] 3,603,796

[72] Inventor Robert L. Chase
        Blue Point, N.Y.
[21] Appl. No. 793,384
[22] Filed Jan. 23, 1969
[45] Patented Sept. 7, 1971
[73] Assignee The United States of America as
        represented by the United States Atomic
        Energy Commission

[54] SEGMENTED GAMMA RAY DETECTOR AMPLIFIER SPECTROMETER
1 Claim, 1 Drawing Fig.
[52] U.S. Cl. .................................................... 250/83.3 R,
                                                        330/124 R
[51] Int. Cl. ..................................................... G01t 1/24
[50] Field of Search ........................................... 250/83.3 R,
        71.5 R, 106 R; 330/30, 124 R; 317/234

[56] References Cited
UNITED STATES PATENTS
3,043,955  7/1962  Friedland et al. ............. 250/83.3
3,527,944  9/1970  Kraner ......................... 250/83.3
OTHER REFERENCES
Price, W. J., Nuclear Radiation Detection; 1964, P. 236–242

Primary Examiner—James W. Lawrence
Assistant Examiner—Morton J. Frome
Attorney—Roland A. Anderson ABSTRACT: An amplifier for use with a segmented-gamma ray detector employing internal detector summing of the linear signal to eliminate the need for complicated external preamplifier gain adjustment and stability. Each segment of the detector is capacitively coupled to a voltage sensitive preamplifier and a charge preamplifier takes the whole charge of the detector.

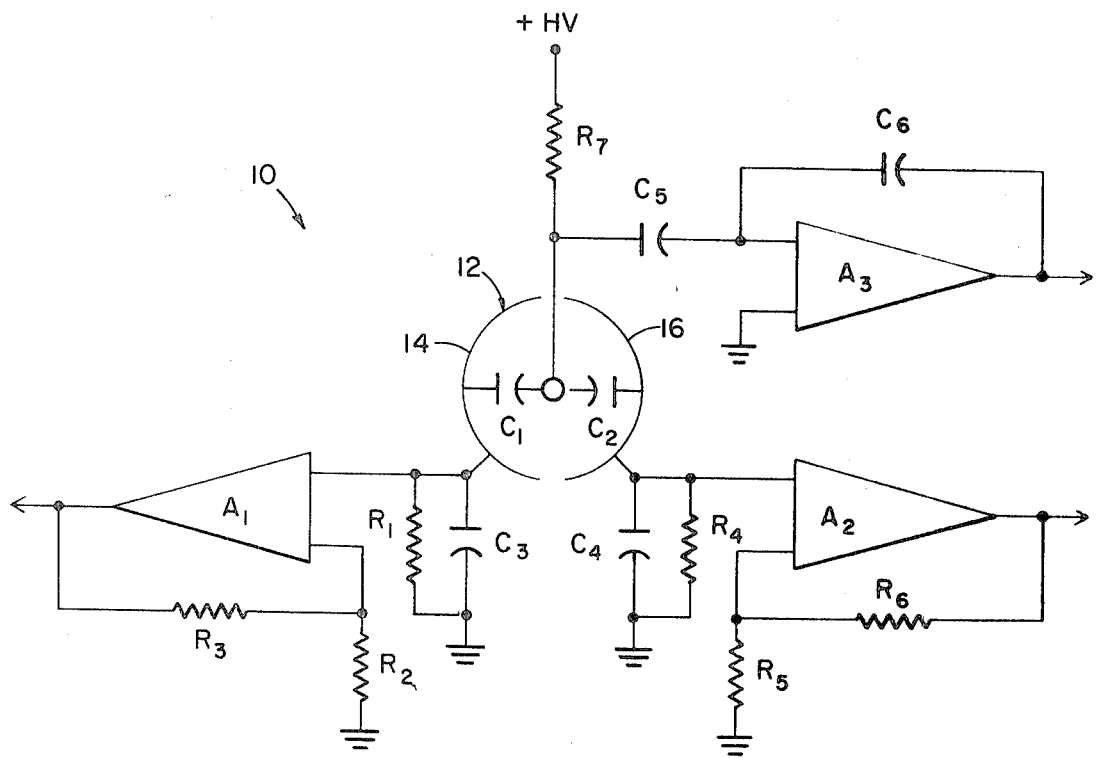
INVENTOR.
ROBERT L. CHASE

3,603,796

SEGMENTED GAMMA RAY DETECTOR AMPLIFIER SPECTROMETER

BACKGROUND OF THE INVENTION

The invention described herein was made in the course of, or under a contract with the United States Atomic Energy Commission.

In the measurement of gamma ray energies, it has been found that a segmented detector can be used to suppress the Compton distribution with respect to the full energy peak if detector signals are recorded only when they are associated with charge collection in more than one segment. In order to accomplish this, it is necessary to derive charge signals from each segment as well as a signal corresponding to the total detector charge. The signal for the total detector charge should maintain a signal-to-noise ratio as high as possible whereas this is not essential for the signals from the individual segments as these signals are only detected but not measured. A preamplifier is needed for each segment to provide segments to a coincidence circuit. These signals can also be summed to provide the total charge signal, but an important disadvantage or problem inherent in this arrangement is that the gain and linearity of the preamplifiers must be matched to a high degree of precision.

SUMMARY OF THE INVENTION

The problem mentioned above associated with the use of a segmented detector to suppress undesirable signals is overcome in accordance with this invention by utilizing voltage sensitive preamplifiers having high shunt capacitors connected to each segment and a charge sensitive amplifier for the total charge flow from the detector. The use of three amplifiers eliminates the necessity of very accurate matching of amplifier gain values. The use of the voltage sensitive configuration in two of the amplifiers reduces their noise contribution.

It is thus a principal object of this invention to provide a detector amplifier with internal detector summing and improved characteristics.

Other advantages and objects of this invention will hereinafter become obvious from the following description of a preferred embodiment of this invention

BRIEF DESCRIPTION OF THE DRAWING

FIG. illustrates somewhat schematically a preferred embodiment of this invention.

DESCRIPTION OF THE PREFERRED EMBODIMENT

Referring to the figure, amplifier 10 is associated with a segmented gamma ray detector 12 schematically shown as consisting in this case of a pair of segments 14 and 16, where capacitors $C_1$ and $C_2$ represent the capacitance of each of the two separate detector segments. A voltage sensitive preamplifier $A_1$ is coupled directly to segment 14 as shown with a bypass or shunt capacitor $A_1$ is coupled directly to segment 14 as shown with a bypass or shunt capacitor $C_3$ and resistor $R_1$, and resistors $R_2$ and $R_3$ determining the voltage gain of amplifier $A_1$.

Voltage sensitive preamplifier $A_2$ is directly coupled to segment 16 with a shunt capacitor $C_4$ and resistor $R_4$ with resistors $R_5$ and $R_6$ completing the circuit as shown.

Detector 12 is supplied with high voltage by a source HV through a resistor $R_7$. Charge sensitive preamplifier $A_3$ receives the total charge from detector 12 through a capacitor $C_5$ and has a capacitor $C_6$ for determining its gain as shown.

The outputs of amplifiers $A_1$ and $A_2$ would be supplied to a suitable coincidence circuit as is understood in the art. Detector 12 would be a segmented gamma ray detector such as that described in U.S. application Ser. No. 766,433 Oct. 10, 1968, by H. W. Kraner, entitled "Total Absorption Spectrometer," now Pat. No. 3,527,944.

It will be seen that the segments of detector 12 are connected in such a way that the total charge flows into amplifier $A_3$ while the individual segment changes flow into amplifiers $A_1$ and $A_2$. If amplifiers $A_1$ and $A_2$ were charge sensitive circuits like amplifier $A_3$, some of the internally generated noise of amplifiers $A_1$ and $A_2$ would be coupled to amplifier $A_3$ through the detector capacitance $C_1$ and $C_2$. However, in the configuration shown, the only additional noise coupled to amplifier $A_3$ is that due to input electrode leakage current in amplifiers $A_1$ and $A_2$, detector leakage current flowing in the input circuits of amplifiers $A_1$ and $A_2$ and Johnson noise generated by resistors $R_1$ and $R_4$ and all of the noise contributions can be reduced as much as required by using sufficiently large shunt capacitors $C_3$ and $C_4$.

If $C_1$ and $C_2$ represent the capacitance of the two separate detector segments and if preamplifier $A_3$ is considered to have very high internal gain so that its effective input capacitance is very large compared to the detector capacitance, then it can be written:

(1)
$$Q_3 = Q_1 \frac{C_3}{C_3+C_1} + Q_2 \frac{C_4}{C_4+C_2}$$

where $Q_3$ is the charge signal to amplifier $A_3$, and $Q_1$ and $Q_2$ are the charges produced in the corresponding detector segments.

$Q_3$ can be made to approach $Q_1+Q_2$ if $C_3$ and $C_4$ are very large, but that might reduce the signals into amplifiers $A_1$ and $A_2$ to the point where they could not be distinguished from noise. However, a reasonable compromise arrangement exists where $C_3$ and $C_4$ are large enough compared to $C_1$ and $C_2$ so that a large fraction of the detector charge reaches amplifier $A_3$, and its signal-to-noise ratio is not degraded excessively, while, at the same time, the signals $A_1$ and $A_2$ can be detected above the corresponding amplifier noises. But, since the division of charge between detector segments is a random process, it is necessary that the coefficients of $Q_1$ and $Q_2$ in Eq. 1 be equal. This is accomplished by trimming the values of $C_3$ and $C_4$ to eliminate line splitting. The large the values of $C_3$ and $C_4$, the less critical is the trimming adjustment. For a detector in which $C_1$ and $C_2$ are about 10 pf., $C_3$ and $C_4$ of about 100 pf. or about multiple of 10 is a reasonable choice. Signals above about 20 kev. at $A_1$ and $A_2$ are well above noise. The trimming adjustment is not unreasonably critical, and the loss the signal at $A_3$ (about 10 percent) is acceptable in most cases.

It is thus seen that there has been provided an amplifier for use with split or segmented gamma ray detectors having a reduced need for external preamplifier gain adjustment and stability while at the same time adding only negligible noise to the output.

While only a preferred embodiment has been described it is understood that variations are possible without departing from the the principles of this invention, such as, for example, a similar arrangement for use with more than two detector segments. Thus the invention is defined only by the following claims.

1. An amplifier for use with a radiation detector having at least two segmented regions and a common connection comprising:
   a. first voltage sensitive preamplifier means connected to receive the voltage output of the first region;
   b. second voltage sensitive preamplifier means connected to receive the voltage output of the second region;
   c. mean connecting said common connection to a source of voltage; and
   d. charge sensitive preamplifier means for receiving the total charge of said detector at said common connection; in which each of said voltage sensitive preamplifier means are provided with shunt capacitances of about 10 times the capacitance of the effective capacitance of its detection region.